Figure 3:
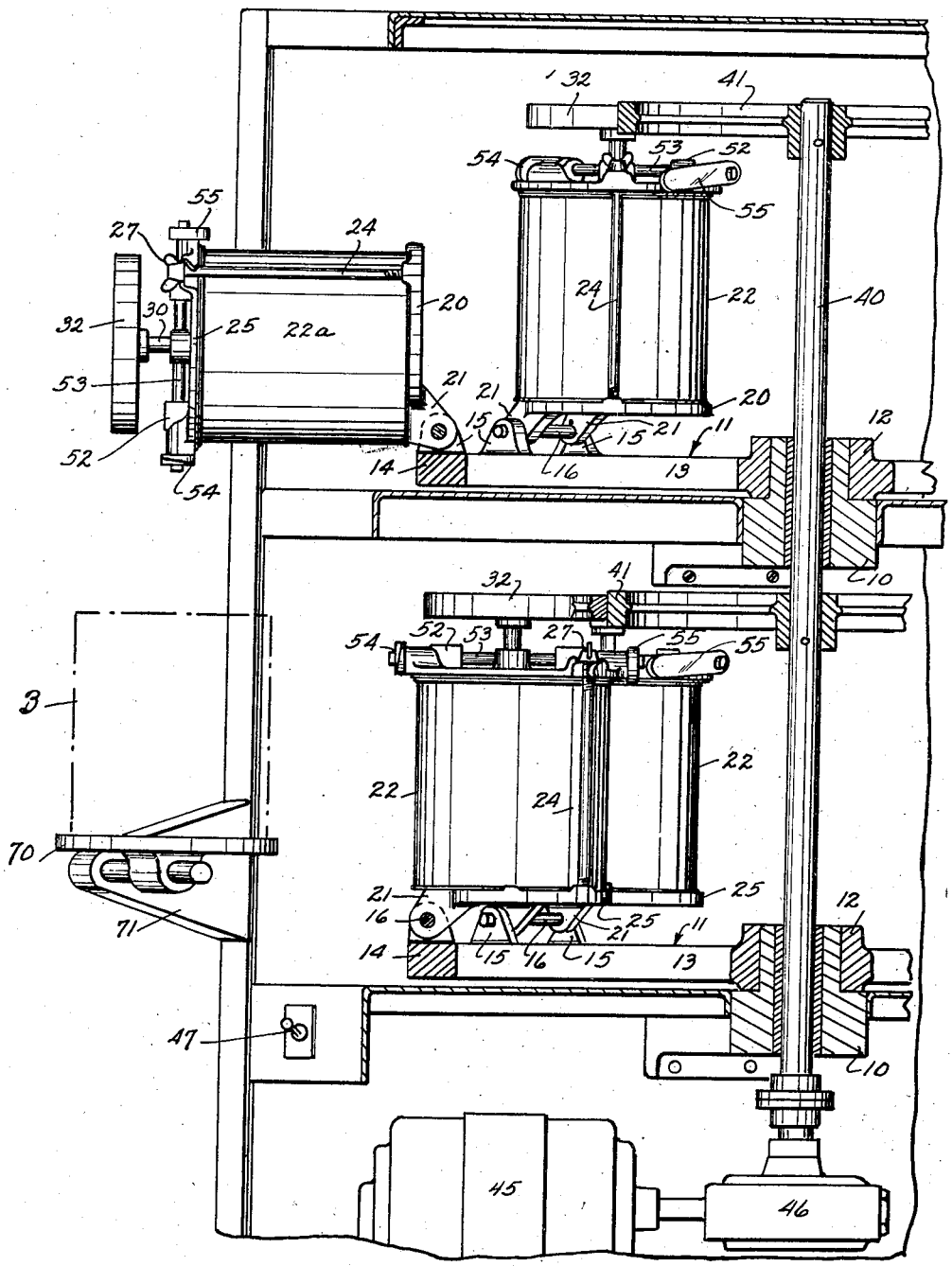

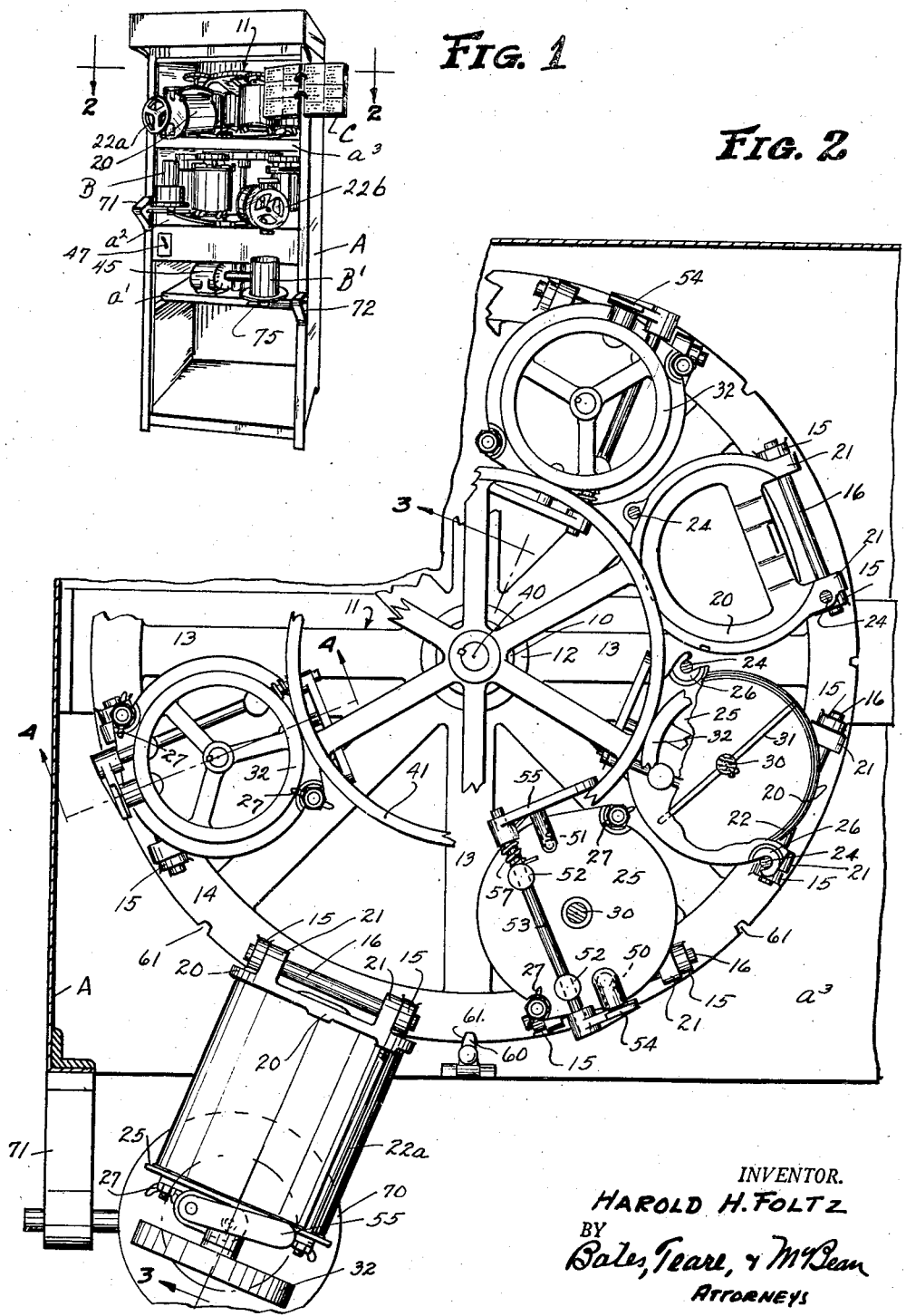

July 15, 1947.   H. H. FOLTZ   2,423,969
DISPENSING APPARATUS
Filed Nov. 21, 1944   3 Sheets-Sheet 3
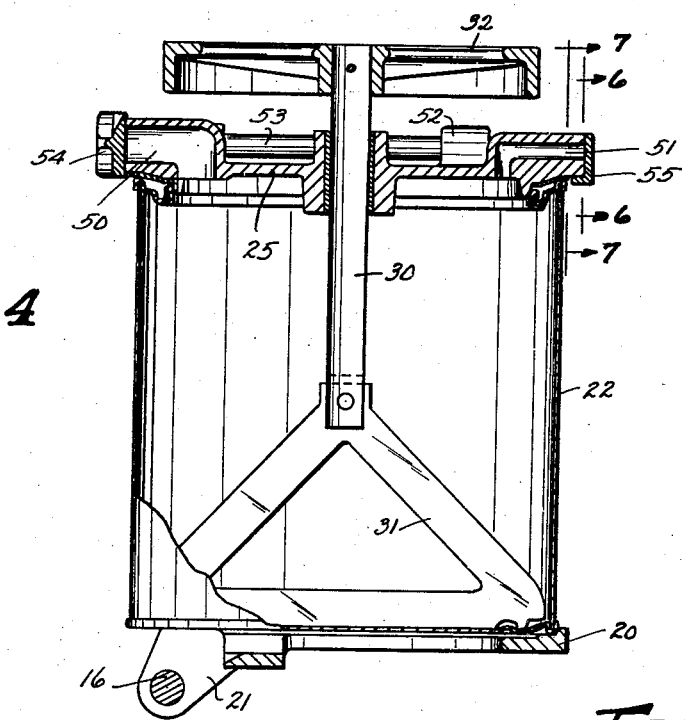
Fig. 4
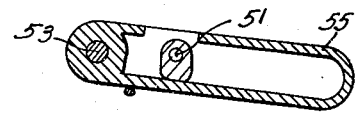
Fig. 6
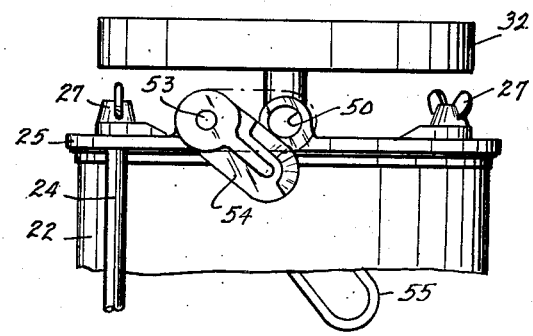
Fig. 5
Fig. 7
INVENTOR.
HAROLD H. FOLTZ
BY
Bates, Teare, & McBean
ATTORNEYS Patented July 15, 1947

2,423,969

UNITED STATES PATENT OFFICE 2,423,969

DISPENSING APPARATUS

Harold H. Foltz, Cleveland, Ohio, assignor to The Arco Company, Cleveland, Ohio, a corporation of Ohio Application November 21, 1944, Serial No. 564,497

2 Claims. (Cl. 259—58)

This invention relates to an apparatus for storing, agitating and discharging as desired different characters of paint or similar material, enabling any desired mixture to be readily effected. The general object of the invention is to provide compact and readily operating means for storing in individual containers quantities of paints of different color or characteristics or for storing other liquids; to provide ready means to agitate the contents of the receptacles as may be necessary or desired; to provide means for enabling any receptacle to be readily brought to a discharging position and tipped to discharge so much of its contents as is desired.

It is also an object of the invention to provide for the agitation by power means of the contents of all of the receptacles at one time, so that the contents may readily be periodically stirred and maintained in proper condition. Another object of the invention is to provide a storage cabinet having a plurality of decks each with a set of dispensing containers all arranged for agitation by a single power means within the cabinet. Another object of the invention relates to the provision of a very effective gate means on each receptacle enabling just the desired quantity of the contents to be discharged whenever desired.

My invention comprises the means by which I accomplish the above results or any of them and other features of the invention illustrated in a preferred embodiment shown in the drawings and hereinafter more fully described.

In the drawings, Fig. 1 is a perspective of a storage cabinet equipped with my storing and agitating apparatus; Fig. 2 is a plan, partly broken away, of one of the receptacle-carrying turrets in the cabinet, with a number of receptacles thereon, some of the receptacles being partially dismantled to indicate different portions of the device; Fig. 3 is a sectional elevation of the parts in two of the stories of the dispensing apparatus in a plane indicated by the line 3—3 in Fig. 2; Fig. 4 is a sectional elevation of one of the containers in the storage apparatus, with its holding means and its individual agitator, the plane of the section being indicated for instance in line 4—4 on Fig. 2; Fig. 5 is a fragmentary elevation of the upper portion of one of the mounted storage containers; Figs. 6 and 7 are details of the operating device for the gates controlling the discharge of each container, the plane of the section being indicated by the correspondingly numbered lines on Fig. 4.

In Fig. 1, A indicates a suitable upright cabinet having a number of horizontal shelves or decks as $a^1$, $a^2$, $a^3$, for instance. As shown, substantially identical storage turrets and agitating apparatus are mounted on each of the decks $a^2$ and $a^3$, while driving apparatus is shown as mounted on the deck $a^1$ and is operable to drive the agitators on both the decks $a^2$ and $a^3$. The lower portion of the cabinet beneath the deck $a^1$ furnishes a convenient storage space for filled cans ready for mounting in either of the turrets. B and B' indicate mixing receptacles to receive paint from the upper and lower set of storage receptacles. Fig. 1 shows also at C a system of charts which may form a convenient guide to the operator in mixing paints from various containers.

Mounted in each deck $a^2$ and $a^3$ is a vertical bushing 10 on which is rotatably mounted a horizontal turret 11. This turret is shown as having a hub 12 journalled on the bushing, spider-like arms 13 extending from the hub and a circular rim 14. Mounted on the upper face of the rim 14 in various regions around about the periphery are pairs of aligned ears 15. Mounted in each pair of ears is a rod 16 by which the corresponding receptacle unit is pivotally carried.

Each receptacle unit on the turret comprises a base 20 hinged to the turret, a removable container 22 resting on the base and a removable head 25 on the container, the head being held tightly on the container (with an interposed gasket if desired) by suitable external rods 24 connected at one end to the base and at the other to the head.

The containers may readily be standard friction top cans. They may be delivered full of paint, for instance, to the cabinet and stored prior to use in the space below the bottom deck $a^1$ thereof. Before mounting the cans in the turret the friction top of the can is removed.

Each receptacle base 20 has a pair of ears 21 projecting from its bottom and embracing the pivot pin 16. When the receptacles are in use in storing paint or similar material they stand in a vertical position. The ears 21 extend downwardly from a region outside of the axis of the receptacle with the result that the receptacle tends to swing inward by gravity, but the agitating mechanism hereinafter described prevents the receptacle swinging inward beyond the vertical position. The receptacle may be manually tipped outwardly into approximately horizontal position (indicated by the receptacle 22$^a$ in Fig. 3) to discharge contents therefrom.

The clamping rods 24 are shown as screw threaded into the base 20 and as extending through notched ears 26 on the head 25. Above such ears, wing nuts 27 on the rods serve to clamp the base, can and head together.

In each receptacle head 25 is journalled the shaft 30 of an agitator 31, Fig. 4. On the upper end of the shaft 30 is secured a wheel 32 having a cylindrical periphery, preferably provided with fine straight knurling, indicated in Fig. 5. Journalled in each frame bushing 10 is the rotatable driving shaft 40 for all of the agitators. This shaft carries at its upper end a wheel 41 with a cylindrical periphery, preferably with an unfinished cast surface. The wheels 32 of the individual receptacles normally bear inwardly against the periphery of the wheel 41. This results from the fact that the ears 21 supporting the receptacles are located in a region on the other side of the axis of the container, so that gravity maintains a snug driving engagement between the driving wheel 41 and each agitating wheel 32 of the set of receptacles.

The shaft 40 may be rotated in any convenient manner. For this purpose I have shown a motor 45 on the cabinet deck $a^1$ connected by worm gearing in housing 46 with the lower end of the shaft 40. When this motor is operated all of the agitators are rotated, thus maintaining the paint or other contents in the receptacles in proper condition.

During the agitating of the contents of the different containers the rotatable turret 11 is locked against movement. I have shown for this purpose a pivoted dog 60 secured to the deck and adapted to engage any of a number of notches 61 in the rim 14 of the turret. When it is desired to agitate the contents of the containers this dog is thrown into any one of the notches preventing rotation of the turret, and the motor 45 is energized, a switch for this purpose being shown at 47 in Fig. 3. This rotates the shaft 40 and through its wheels 41 and the various agitator wheels 32, rotates all of the agitators.

I have referred to the head 25 of each receptacle as being removable. This head is of special form, best shown in Fig. 4. It has a discharge spout 50 leading upwardly and outwardly from the outer side of the head and a venting passageway 51 leading upwardly and inwardly at the opposite side of the head. Rotatably mounted in ears 52 on the head is a shaft 53 carrying a gate 54 adapted to close the spout 50 and a gate 55 adapted to close the vent 51. A suitable handle acting on the shaft 53 provides manual means for giving it a sufficient turn to move the gates away from the ports they cover.

Each gate shaft 53 is provided with a spring to maintain the gates normally in closed position. Such spring is shown in the drawing at 57 as a torsion spring surrounding the shaft and anchored at one end to it and at the other end bearing on the head 25. The handle for manually turning the shaft 53, against the action of the spring 57, is shown in the drawing as a continuation of the vent gate 55. Whenever a receptacle has been tipped into the horizontal position, the operation of the lever 55 enables just the desired amount of the contents to be discharged.

The dispensing from the apparatus is intended to take place at a certain location of the container to be dumped. I provide a shelf 70 mounted on a bracket 71 of the cabinet frame to support a suitable mixing receptacle indicated at B in Figs. 1 and 3 to receive contents of the dumped container 22ª of the upper set. Similarly a bracket 72 carries a shelf 75 to support a mixing receptacle to receive paint from the dumped container 22ᵇ of the lower set.

The motor being shut off and the locking dog 60 turned to idle position, either rotatable turret may be turned manually to bring any desired receptacle thereon into the position adapted to be above the mixing receptacle on the supporting shelf, and then such selected receptacle is manually tipped over into horizontal position, as shown in the case of the container 20ª in Fig. 3. Then the spout and vent are open by the operation of the hand lever 55 and so much of the contents of this receptacle as is desired pours into the receiving vessel B or B'.

As the driving mechanism for the agitators will be stationary when the motor is not operating and the shaft 40 locked by reason of the worm wheel drive, the wheel 41 will be held stationary, and when the turret is turned to bring a proper receptacle to discharging position all of the agitators will be given a slight turn which will be beneficial in connection with the material about to be discharged. If desired, the operator may manually manipulate the turret back and forth to increase this agitation.

It is understood that ordinarily there will be different colors of paint in the different receptacles. The user can thus store a large number of different colors, and be able by suitable mixing, under the guidance of the charts on the cabinet to produce for delivery any color desired.

I claim:

1. In a paint mixing and dispensing apparatus, the combination comprising: a frame; a vertical shaft rotatably supported by said frame and means controllably rotating said shaft; a block surrounding said shaft and having an upwardly facing horizontally disposed bearing surface, said block being rotatable with respect to said shaft and non-rotatably held with respect to said frame; a table perpendicular to and concentric with said shaft and freely rotatable with respect thereto supported by the bearing surface of said block; a plurality of containers pivotally supported on said table along a circle thereon concentric with said shaft and each movable on such pivotal support in a plane substantially perpendicular to said table and parallel with the radius of said table extending through substantially the center of such container, such pivotal supports being placed radially outward with respect to said table of the center of gravity of said containers when said containers are in a substantially upright position; agitating means within each container; a driven wheel above each container and operably associated with said agitating means; a driving wheel affixed to said shaft for rotation therewith and spaced from said table, said wheel being of diameter sufficiently smaller than that of said circle that its periphery will contact the periphery of each of said driven wheels when said containers are in substantially upright position; means for selectively holding said table against rotation; whereby said containers may by gravity hold their respective driven wheels sufficiently against said driving wheel to effect an easily disconnected driving engagement therebetween, and whereby when said table is held against rotation, rotation of said driving wheel will actuate the agitating means of those containers whose driven wheels are in contact with said driving wheel and when said table is permitted to rotate the viscosity of paint within said containers will hold said driven wheels sufficiently against rotation that the operation of said driving wheel thereagainst will cause rotation of the entire table.

2. In a paint mixing and dispensing apparatus, the combination comprising: a frame; a vertical shaft rotatably supported by said frame and means controllably rotating said shaft; a table perpendicular to said shaft and freely rotatable with respect thereto; means associated with said frame supporting said table but permitting rotation thereof with respect to said frame; a plurality of containers pivotally supported on said table along a circle thereon concentric with said shaft and each movable on such pivotal support in a plane substantially perpendicular to said table and parallel with the radius of said table extending through substantially the center of such container, such pivotal supports being placed radially outward with respect to said table of the center of gravity of said containers when said containers are in a substantially upright position; agitating means within each container; a driven wheel above each container and operably associated with said agitating means; a driving wheel affixed to said shaft for rotation therewith and spaced from said table, said wheel being of diameter sufficiently smaller than that of said table that its periphery will contact the periphery of each of said driven wheels when said containers are in substantially upright positions; means for selectively holding said table against rotation; whereby said containers may by gravity hold their respective driven wheels sufficiently against said driving wheel to effect an easily disconnected driving engagement therebetween, and whereby when said table is held against rotation, rotation of said driving wheel will actuate the agitating means of those containers whose driven wheels are in contact with said driving wheel and when said table is permitted to rotate the viscosity of paint within said containers will hold said driven wheels sufficiently against rotation that the operation of said driving wheel thereagainst will cause rotation of the entire table.

HAROLD H. FOLTZ.

REFERENCES CITED

The following references are of record in the file of this patent:

UNITED STATES PATENTS

| Number | Name | Date |
|---|---|---|
| 1,678,735 | Larson | July 31, 1928 |
| 1,842,939 | Hancock | Jan. 26, 1932 |
| 2,065,440 | Flaum | Dec. 22, 1936 |
| 2,094,702 | Hexter | Oct. 5, 1937 |
| 2,131,662 | Holmes | Sept. 27, 1938 |
| 2,218,808 | Brotheridge | Oct. 22, 1940 |